March 1, 1938.　　　　B. M. SHORT　　　　2,109,684
WHEEL HUB LOCK STRUCTURE
Filed Sept. 30, 1935　　　5 Sheets-Sheet 4

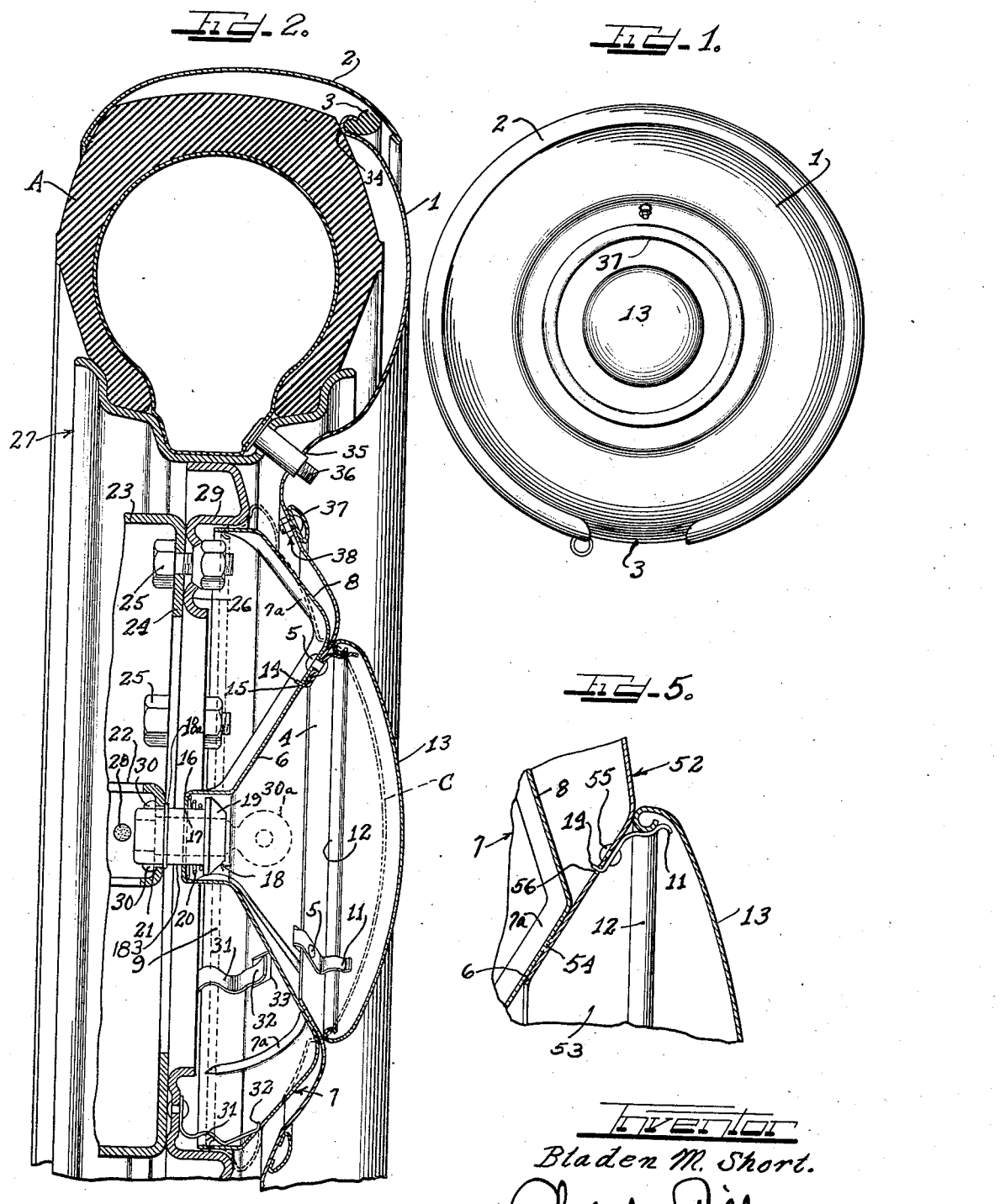

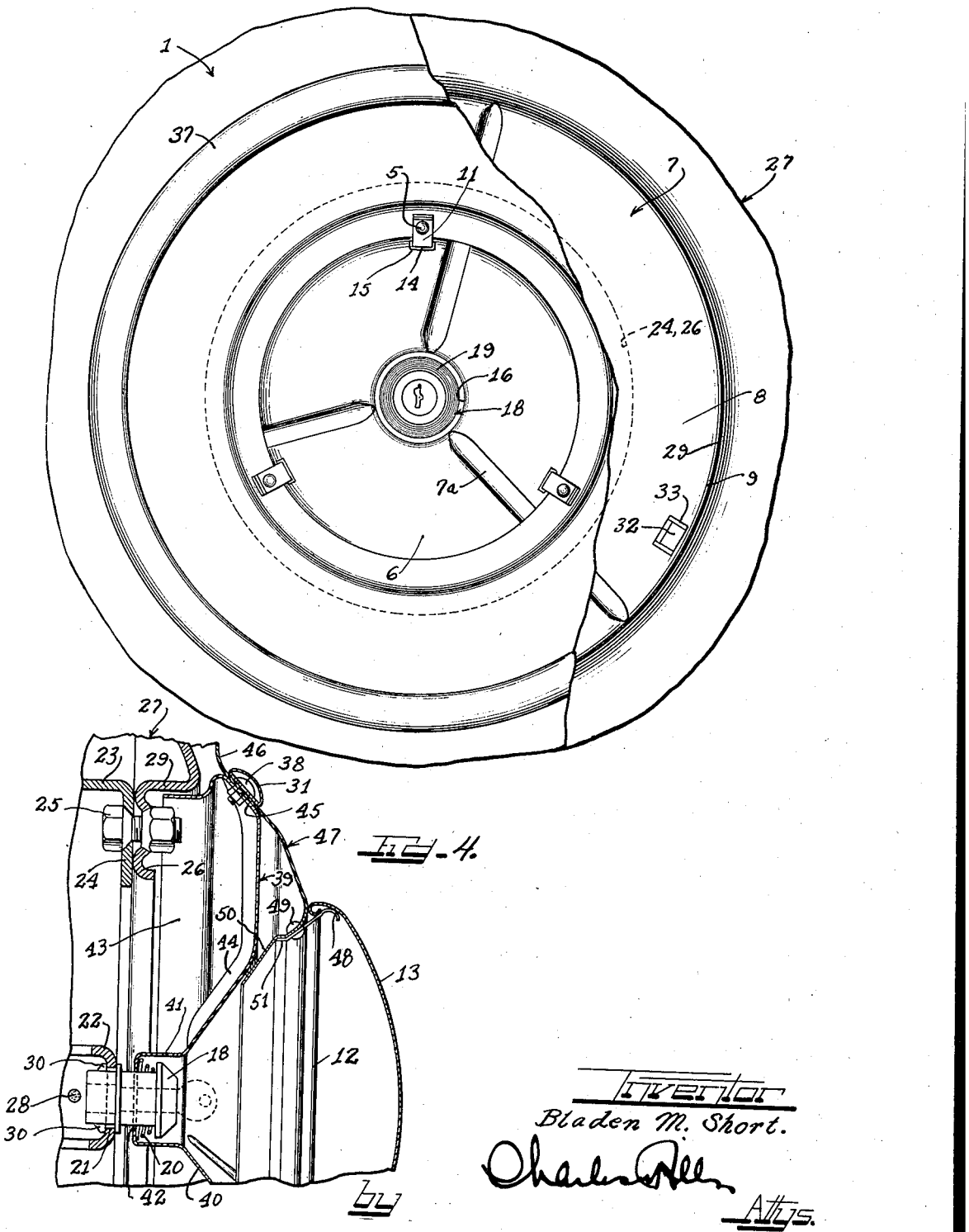

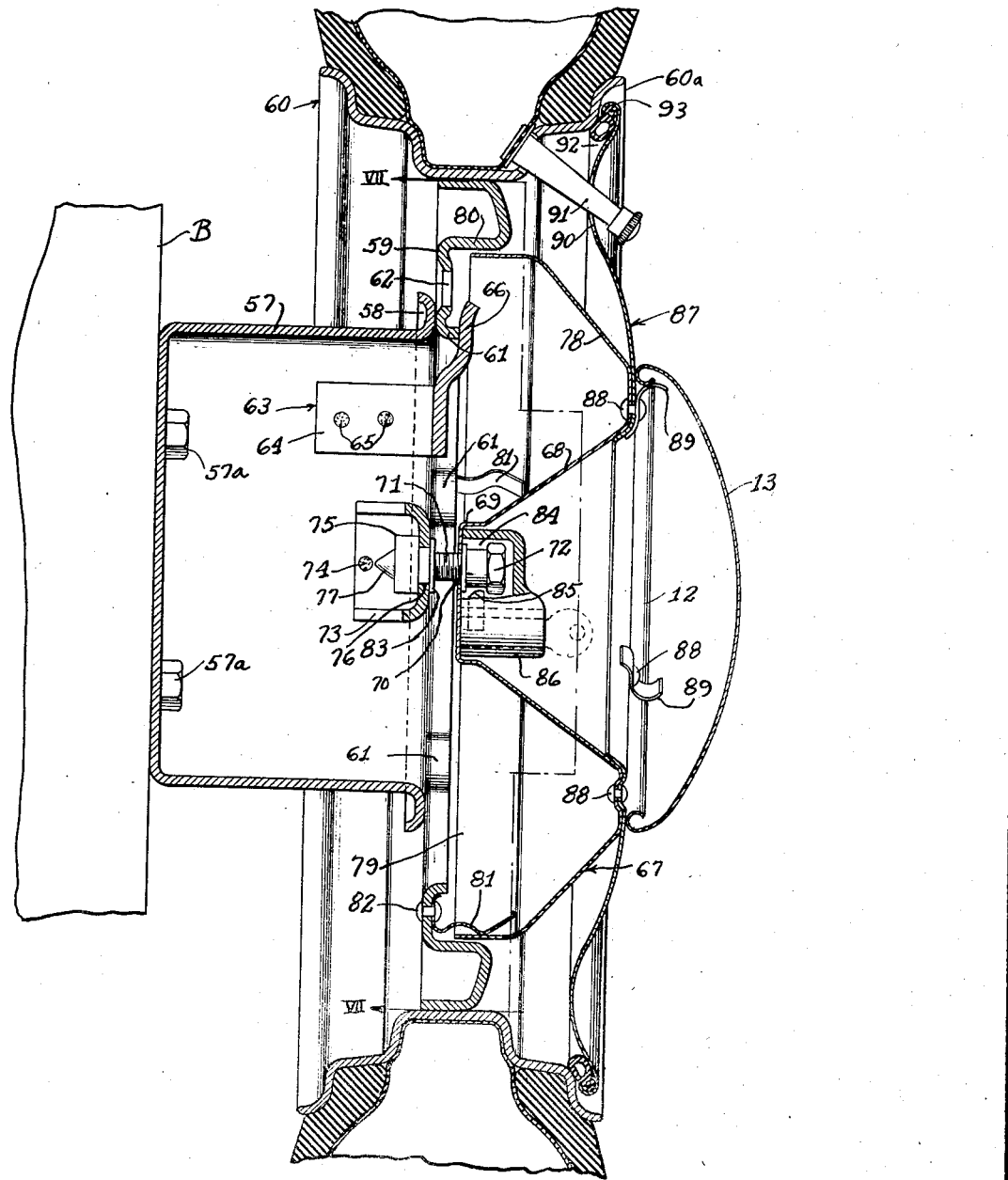

Inventor
Bladen M. Short.
by Charles M. Allen
Attys.

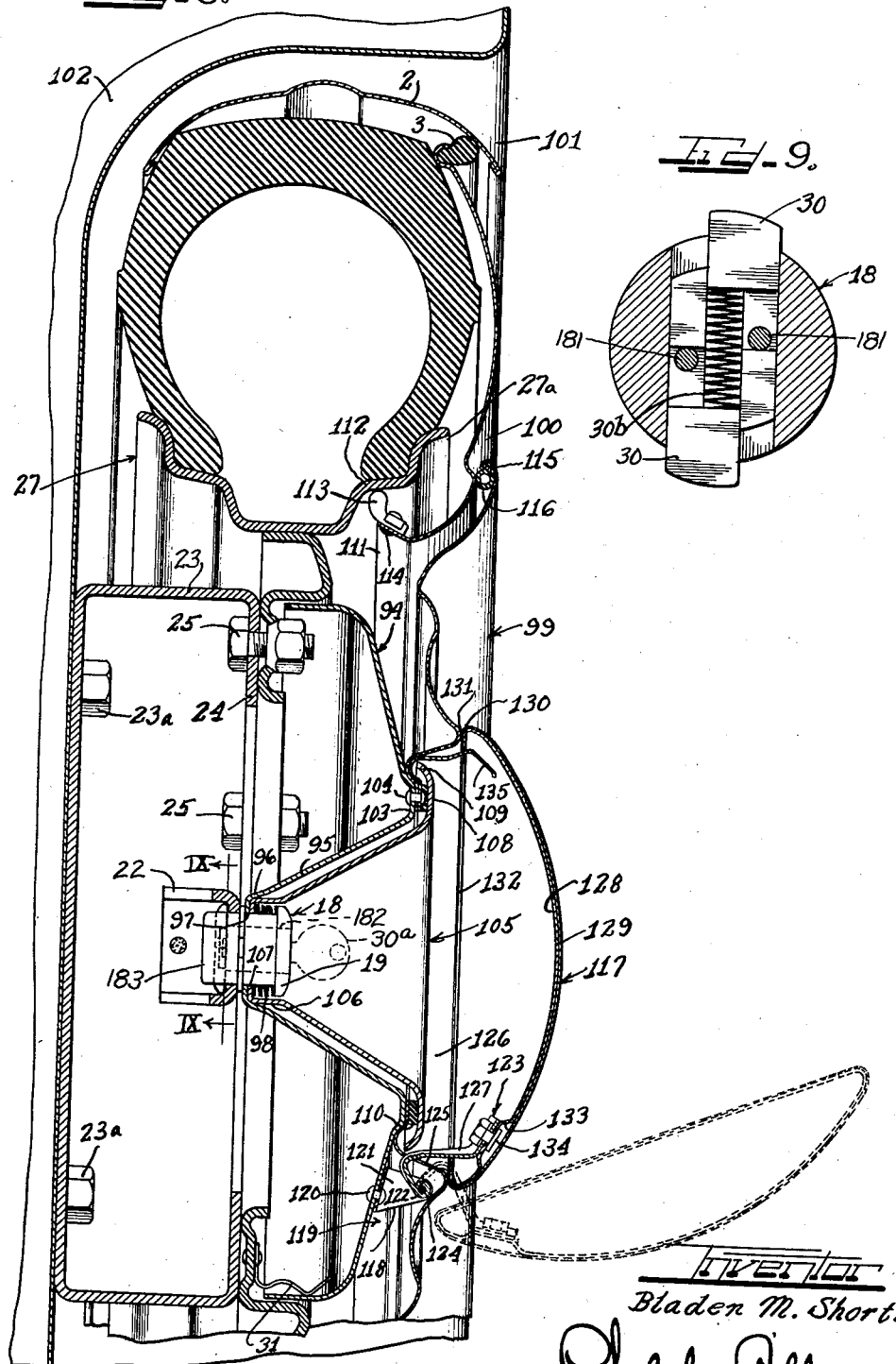

Patented Mar. 1, 1938

2,109,684

UNITED STATES PATENT OFFICE 2,109,684

WHEEL HUB LOCK STRUCTURE

Bladen M. Short, Detroit, Mich., assignor, by mesne assignments, to Houdaille-Hershey Corporation, Detroit, Mich., a corporation of Michigan Application September 30, 1935, Serial No. 42,747

5 Claims. (Cl. 150—54)

This invention relates to locks, and is concerned more particularly with an improved lock structure for a wheel and cover.

It is an object of the invention to provide a wheel locking structure which by virtue of locking the wheel, also locks in place a shield for the wheel alone or for the wheel and tire.

It is another object of the invention to provide a wheel structure embodying yieldable supporting means interchangeably cooperative with a locking and shield structure for the wheel and with the service hub cap for the wheel.

It is a further object of the invention to provide a disk which may be adapted to shield a side of the wheel, or both a side of the wheel and a side of the tire carried thereby, to be supported and locked in position by a unitary supporting and locking device of the snap-on or other type.

It is a further object of the invention to provide a wheel lock and shield construction which may be applied to and removed from locking position without disturbing the tire shield.

It is also an object of the invention to provide a wheel lock and shield structure including means insulating them apart to prevent rattling therebetween.

Another object of the invention involves the provision of a shield with means for supporting the same from the rim or other part of the wheel.

Another object of the invention involves the provision of a unitary locking theft-proof structure designed to shield all of the attaching means by which the wheel is connected to the wheel carrier.

Another object of the invention involves the provision of hood or shell structure including centrally located means for locking the hood in a position preventing unauthorized access to the wheel mounting means.

It is also an object of the invention to provide a combination wheel and wheel lock structure affording means for guiding the structure into proper cooperative relation with the wheel.

An additional object of the invention resides in the provision of an adjustable or floating relation between the locking unit shield for compensating for various widths of tires of the same nominal size.

In accordance with the general features of the invention, a drum-shaped member may be formed to be assembled telescopically with the wheel and provided with a substantially central depression for receiving the head of a securing or locking device. A carrier arranged to be at the rear of a wheel and to which the wheel may be bolted or otherwise detachably secured is formed to receive the device aforesaid. This device may incorporate theft-proof means, operable by a key, if desired, and the drum-shaped member may be arranged to prevent unauthorized access to the means supporting the wheel on the carrier. When the device is locked in place, it not only locks the drum-shaped member, but also locks the wheel, and a disk may be carried by the drum-shaped member and cooperates with the tire shield in such a manner as to lock the tire shield in place when the drum-shaped member is locked in place.

The wheel is provided with hub cap retaining means such as springs which are also usable interchangeably to engage yieldably the drum-shaped member and guide the same in proper relation to the wheel.

Also in accordance with the invention, the automobile on which the carrier is mounted may be formed with a generally circular depression of such depth as to receive substantially the entire wheel, cover and tire assembly. Where the tire cover includes a tread-embracing band, such band is applied to the tire before mounting of the wheel, and is not removable until after dismounting of the wheel.

Rattling of relatively movable parts is insured against by the provision of rubber or like padding.

The structure is provided with means for detachably or movably mounting a cap which may simulate a hub cap and which, when mounted, shields the locking unit.

Other objects and advantages of the invention will appear as the description proceeds.

This invention, in preferred forms, is illustrated in the drawings and hereinafter more fully described.

Figure 1 is a front elevational view of a wheel and shield constructed in accordance with the invention.

Figure 2 is an enlarged fragmentary sectional view showing details of one form of the invention.

Figure 3 is a fragmentary front view of an inner portion of the structure appearing in Figure 2, with the cap entirely removed, and with a portion of the shield removed to show the telescoping relation of the wheel and the drum for shielding the wheel supporting means.

Figure 4 is an enlarged fragmentary sectional view showing a modified construction for connecting portions of the shield structure together.

Figure 5 shows a still further modified form of the invention.

Figure 6 is a view similar to Figure 2, but of another form of the invention.

Figure 8 is a view similar to Figure 2, but of a further modified form of the invention.

Figure 9 is an enlarged sectional view of certain details of the locking mechanism.

Figure 7:
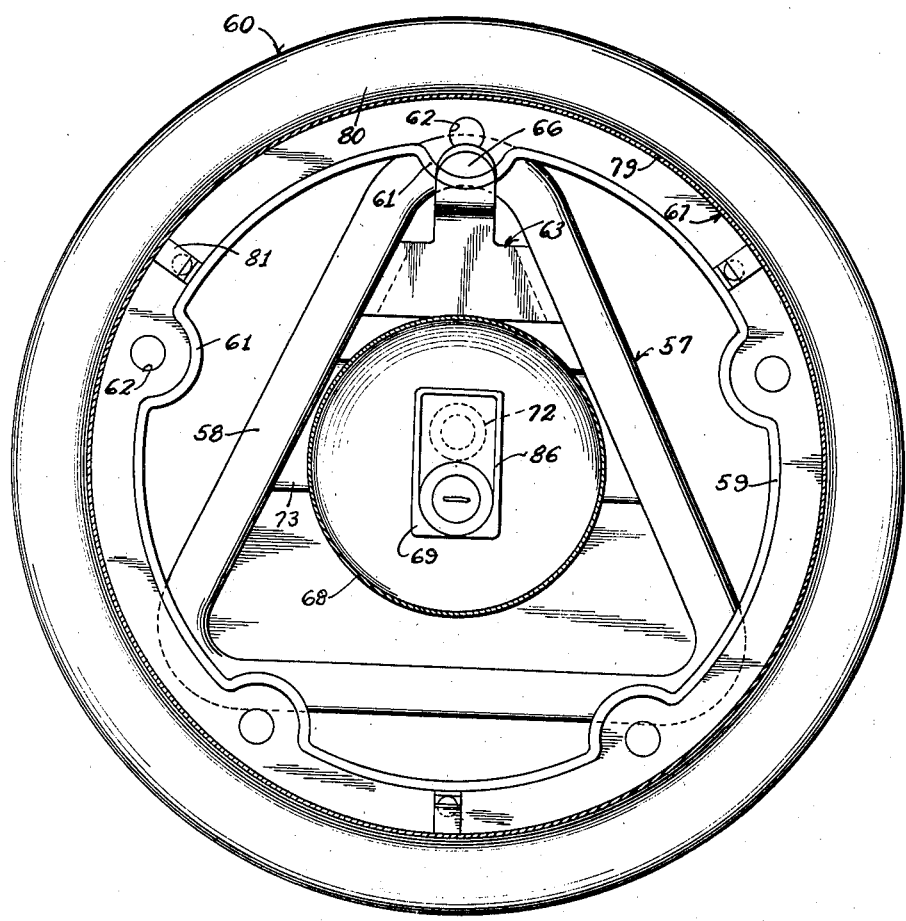
Figure 7 is a front sectional view taken substantially as indicated by the line VII—VII in Figure 6.

Referring now more particularly to the drawings, one shield section selected for illustrative purposes herein comprises a side plate 1 and a resilient split ring 2 cushioned therefrom by a rubber or other suitable bead 3, although it is to be understood that the invention is equally applicable to a cover structure which may be formed in a unit to extend over the tread as well as at the front of the tire, or it may be of such a character as to cover substantially only the wheel, or it may be made of cooperating parts covering the wheel and tire.

In the form of the invention appearing in Figures 1, 2 and 3, the plate 1 is of annular form and, at its inner peripheral margin 4, is riveted at 5 or otherwise suitably secured to a rearwardly and centrally depressed portion 6 of a drum-like stamping 7. The stamping 7, outwardly of its depressed portion 6, may be tapered rearwardly at 8 and preferably terminates in a generally cylindrical rear margin 9. The drum 7 may be smooth throughout and may be provided with strengthening ribs 7a. Three equally spaced ribs 7a may be employed, or any other suitable number other than three. The securing means 5 may also serve to fasten spring elements 11 in position to receive the turned edge portion 12 of a cap 13 which may simulate a hub cap. The inner end 14 of each spring 11 is extended into a hole 15 in the depressed portion 6 of the drum 7 in order to prevent rotation of the spring 11. Three such springs may be found suitable, and, of course, any number may be employed as desired.

The depressed portion 6 terminates rearwardly in a generally cup-shaped portion 16 having a hole 17 in its bottom for the reception of a locking unit 18. The unit 18 is preferably flanged at 19 in front of the opening 17 to provide space for a spring 20 which serves to urge the unit 18 forwardly and the drum 7 rearwardly, relative to each other. A flange 18a on the unit 18 and disposed rearwardly of, and of a larger size than, the opening 17 serves to prevent separation of the unit 18 from the drum member 7. This flange may be formed in any suitable manner, such as by the provision of a peripheral groove outside of the unit 18 and a split ring snap-locked into the groove.

The rear end of the unit 18 is formed to fit in an opening 21 in a bar 22 mounted on a wheel carrier 23 which may be suitably permanently fastened to the vehicle chassis or body. The carrier 23 may be of any suitable formation and may include a peripheral wall flanged inwardly at 24 for attachment by bolt means 25 or other suitable means to the attaching flange 26 of a wheel 27. The bar 22 may be in the form of a channel member bridging the space within the flange 24 and bent rearwardly at its ends and spot welded as at 28 or otherwise suitably secured to the peripheral wall portions of the carrier 23.

The wheel-attaching flange 26 provides the base of a rearwardly depressed hub affording a substantially cylindrical peripheral wall 29 in which the corresponding peripheral wall 9 of the drum member 7 is telescopically received as shown in Figure 2. It will be observed that when the parts are telescoped together as shown, the wheel-attaching bolt means 25 are completely shielded from the front.

The wheel 27, between the wall 29 and the tire supporting rim, may be in the form of an imperforate annulus, or may be perforated in the form of a spoked wheel.

The locking unit 18 is provided with one or more detents 30 controllable by a key inserted as shown in dotted lines at 30a in Figure 2, so as to engage the rear side of the bar 22 adjacent the opening 21, or be released therefrom, as desired. When the detents 30 are in locking positions, the front part of the bar 22 is engaged by the flange 18a to thereby fixedly lock the unit 18 to the bar 22. The detents 30 may be manually moved in or out, or, if desired, spring means 30b may be employed for moving them out, as shown in Figure 9. Either form of construction may be found in conventional locks of this type.

If it is desired to employ only the drum member 7 and associated cap 13, the tire cover member 1 may be omitted and the spring elements 11 secured directly to the depressed portion 6.

In order to facilitate proper positioning of the drum member 7, the attaching flange 26 of the wheel is preferably provided with forwardly extending springs 31 engageable with the inner side of the member 7 and having free ends 32 engageable in holes 33 in the member 7 to hold the latter in proper location. Such springs may be engaged with the inner periphery of the member 7 in the absence of such holes, or irrespective of the presence of such holes. When such holes are present, it is not necessary to align them with the springs when the member 7 is applied. The initial angular relationship of the holes to the spring elements is unimportant, since, after the member 7 is telescoped over the springs, the member 7 may be rotated until the springs snap into the holes.

The springs 31 are so formed and arranged as to perform the function of receiving by a snap action the hub cap C, which may be applied for use in service with the wheel in the absence of the locking structure. Accordingly, it is evident that the spring elements 31 serve to interchangeably receive and cooperate with the locking and cover structure, and the service hub cap for the wheel.

When a cover member such as the cover plate 1 is employed in conjunction with the drum member 7, the position of the parts may be determined by the engagement of the plate 1 with the tire A as at 34. The spring 20 thus serves to press the plate 1 against the tire, while the remainder of the structure is held substantially free of contact with the wheel. Thus rattling is substantially prevented. For a nominal size, tires may vary to some extent. The spring 20 is effective to compensate for tires of different widths, and the structure will be operative even though the engagement of the plate 1 with the tire may be forward or rearward of the line 34.

The plate 1 is preferably provided with an opening 35 to allow the tire valve stem 36 to project outwardly therefrom, so that the same may be accessible without necessitating the removal of the plate 1.

The plate 1 may be provided with suitable ornamentation, such as the bead 37 held in place by the means 38 or any other suitable means.

Figure 4 shows a somewhat modified construction, wherein a drum member 39, corresponding to the drum 7 previously described, has a substantially central depression 40 having at its apex a substantially cup-shaped part 41 with an opening 42 at its bottom for cooperation with a locking unit 18 and carrier bar 22, as above described. The drum member 39 is also provided with an outer peripheral substantially cylindrical margin 43 for cooperating with the wheel hub portion 29 in a manner described above in connection with the portion 9 of the member 7. The drum member 39 may be provided with reinforcing ribs 44 and a circular tapered portion 45 for substantially intimate engagement with a correspondingly tapered portion 46 on the cover member 47. The cylindrical margin 43 may cooperate with the hub cap retaining springs shown in Figure 2, in the absence of such hub cap, to guide and center the drum member 39 and afford a floating mounting therefor from the wheel.

The bead 37, instead of being connected merely to the cover member, has its fastening means 38 passing through the tapered portions 45 and 46 so as not only to fasten the bead in place, but to fasten the cover member 47 to the drum-like member 39. These fastening means 38, of which there is preferably a circumferential series, may be relied upon as the sole connecting means between the members 39 and 47.

The cover member 47 may extend outwardly to cover substantially only the front of the wheel, or may be extended further, if desired, to cover also the front or the front and tread of the tire.

The spring elements 48 connected at 49 to an inner depressed part 50 of the cover 47 may be employed to detachably secure the cap 13 in place. The rear end 51 on each of the springs 48 is bent abruptly into engagement with the depressed portion 50 so as to preclude rotation of the spring elements. Three or any other suitable number of spring elements 48 may be provided.

A still further modified structure, somewhat similar to that appearing in Figure 2, is shown in Figure 5. In this form, the cover member 52 has a rearwardly depressed portion 53 which is welded at 54 or otherwise suitably united with the depressed portion 6 of the drum member 7, and the spring elements 11 are secured as at 55 to the depressed portion 53, rotation of the elements 11 being precluded by the insertion of the ends 14 through openings 56 in the depressed portion 53.

Another modified form of the invention is shown in Figures 6 and 7. A portion of the vehicle body or chassis is shown fragmentarily at B, to which a generally cup-shaped carrier 57 is secured, preferably permanently, by any suitable means as at 57ᵃ. The carrier may be triangular as shown in Figure 7, or of any other suitable outline, and is preferably provided with an outwardly extending flange 58 for abutment with the rear side of the attaching flange 59 of the wheel 60. The flange 59 is formed with a suitable number of inwardly extending ears 61 of sufficient size to permit of the provision of bolt holes 62 whereby the wheel may be bolted at the axle in a position to support the vehicle. Any suitable number of ears may be provided.

A retaining element 63 is provided to cooperate with the carrier 57 in detachably supporting the wheel. The element 63 is substantially T-shaped, its head 64 being bent into the form of a U with its sides extending rearwardly and spot welded at 65 to the wall of the carrier 57, and with its stem 66 extending upwardly in front of and in spaced relation to the carrier flange 58. The inner part of each ear 61 is extended transversely and is adapted to fit between the flange 58 and the stem 66 without wedging. The blunt outer margin of the flange 58 and the adjacent end of the stem 66 diverge to facilitate the guiding of the ear 61 into the space between them.

The drum member, and associated structure may be of any suitable character, those chosen for illustrative purposes in connection with Figures 6 and 7 resembling somewhat that form appearing in Figure 2, with the exception of the cover member. The drum-like member 67 is accordingly formed with a radially inner rearwardly depressed portion 68 of round or any other desired form, terminating rearwardly in a non-circular cup-like part 69 having in its bottom a hole 70 through which the threaded shank 71 of a securing bolt 72 may extend.

The carrier 57 is provided with a bar 73 arranged to extend between opposed portions of the carrier and to be bent rearwardly and spot-welded at 74 or otherwise suitably secured to the carrier. A nut 75 is disposed at the rear side of the bar 73 substantially in the middle thereof and has a hollow stem passing forwardly through a hole 76 in the bar and spun out into a flange 83 is a manner to lock the nut against rotation in the hole. The free end of the shank 71 may be tapered as at 77 to facilitate positioning of the shank in the various openings.

The drum-like member 67 is outwardly tapered rearwardly at 78 and terminates in a rearwardly extending substantially cylindrical margin 79 which is telescopically receivable by the similarly formed hub wall 80 of the wheel 60. The substantially cylindrical margin 79 is easily guided and held against rattling in the wall 80 by a plurality of springs 81 engageable with the margin 79 and secured at 82 to the attaching flange 59 of the wheel. In the absence of the drum-like member 67, said springs 81 serve to retain the service hub cap in place, as shown in connection with the form illustrated in Figure 2.

The bolt 72 may be locked against theft and, to this end, is provided below the head thereof with a peripheral groove 84 adapted to receive a locking detent 85 carried by a lock housing 86, which may be of the snap-on type, if desired. This housing is preferably of the same non-circular outline as the part 69 of the drum-like member 67, so that the housing cannot be rotated therein. The detent 85 may be key-operated and, when the detent is in depressed position, the housing may be readily applied to and removed from the bolt 72.

The bolt 72 is arranged eccentrically to the peripheral wall 79 of the drum-like member 67, and therefore to the associated wall 80 of the wheel 60. Consequently, it is clear that the drum-like member 67 cannot be rotated appreciably with respect to the wheel 60. Hence, unauthorized retraction of the bolt 72 is prevented.

The cover member 87 is preferably open centrally and is arranged to project into the depression 68 and to engage in the drum-like member 67 intermediate its depressed portion 68 and outwardly tapered portion 78. At suitable places along the area of engagement, the cover member 87 is riveted as shown at 88 or otherwise suitably secured in place to the drum-like member 67.

The bolt 72 and the housing 86 serve not only to lock the drum-like member 67 and cover member 87 in place, but also to lock the spare wheel and tire against theft.

In this form of the invention appearing in Figures 6 and 7, the cover member 87 is formed to terminate at the rim 60ᵃ of the wheel 60. This cover member 87 is provided with a suitable opening 90 through which the tire valve 91 may extend, so as to be accessible without necessitating removal of the lock and cover structure. In order to prevent rattling between the cover 87 and the rim 60ᵃ, a cushion bead 92 of rubber or other yeilding material is clinched at 93 to the outer peripheral portion of the cover 87 and is arranged to project therefrom in such a manner as to engage the rim 60ᵃ and space the cover member 87 from said rim, as clearly seen in Figure 6.

Somewhat similar to the form shown in Figure 2 is that appearing in Figure 8. In this modified construction, the hood 94 has a generally central funnel portion 95 provided at its apex 96 with a central opening 97 for the lock unit 18. A spring 98 urges the unit 18 forward and thus urges the hood 94 rearwardly relative to the unit 18 and holds the attached cover member 99 for the wheel and cooperating cover member 100 for the tire in position, nothwithstanding the fact that tires engaged by the tire cover member may be of different widths for the same nominal size.

In this construction, as just noted, the cover is preferably made in a plurality of parts, including an inner wheel-covering part 99 and an outer front tire cover member 100. Also shown in conjunction with this from of the invention is a substantially annular split resilient tread-covering member 2 cushioned from the tire cover member 100 by a cushion bead 3 such as is shown in Figure 2. While this structure is capable of being applied to a carrier such that the wheel and associated structure projects clear of the automobile body, this structure has been shown for illustrative purposes in Figure 8 as fitting in a circular well or depression 101 in the vehicle body 102. Since the tread-covering band 2 must be expanded to a greater extent than the peripheral wall of the depression 101 permits, either to apply or remove the band 2, it is evident that once the locking structure is locked in place, with the wheel mounted on the carrier, the entire cover structure is effectively locked, notwithstanding the fact that the parts 2 and 100 are not individually secured to the locking member.

The cover member 99 is attached to the hood at the front 103 of the funnel portion 95 as by rivets 104.

To prevent an unauthorized person from gaining access to and cutting off the heads of the rivets and stealing the wheel, tire and cover, a protective or guard plate 105 is provided. This plate, which is preferably of a form similar to the central portion 95 of the drum-like member or hood 94, is inwardly turned at its apex 106 for engagement with the apex 96 of the hood, and is centrally open at 107 to allow the locking unit 18 to pass therethrough. The spring 98 is disposed between the apex 106 of the guard plate 105 and the lock unit flange 19. This unit allows the plate to swivel, but locks it to the hood 94.

The front part of the guard 105 is flanged outwardly at 108 in a position where it overlies the rivets 104 and, at its edge 109 outwardly beyond the rivets, is turned rearwardly into close proximity to the riveted parts of the wheel cover 99 so as to provide a protective overhanging rim preventing insertion at the rear thereof of a riveting mutilating tool. The amount of movement allowed by the spring 98 is merely sufficient to compensate for different positions which may be occupied by the wheel cover 99 due to different widths of tires of the same nominal size and different shapes of tire cover member 100. The amount of movement allowed by the spring 98 is insufficient to permit entry of such a tool between the guard rim 109 and the wheel cover 99. Moreover, the guard plate 105 is case-hardened to prevent cutting thereof. Thus, the plate 105 effectively prevents unauthorized access to the rivets.

The guard plate 105 is prevented from rattling against the hood 94 and rivets 104 by anti-rattling cushion means 110 bonded or otherwise suitably secured to the front of the riveted portion of the wheel cover 99 and over the front heads of the rivets 104. This cushion means is preferably of ring form, but if desired may comprise a plurality of pads. The rearmost portion of the guard plate apex 106 is preferably slightly spaced from the corresponding portion of the apex 96 of the hood 94, so that the cushion means 110 is effective to prevent rattling between the parts at the apexes thereof. Thus, the guard plate 105 is in effect floatingly mounted.

The tire shield 100 is preferably of annular form and its inner periphery is projected rearwardly as at 111, where it is surrounded by a lateral circumferential wall 112 of the rim 27ᵃ of the wheel 27. Cushion friction pads 113 of rubber or the like are secured by rivet means 114 or otherwise to the exterior of the inner peripheral margin 111 of the cover member 100 and are so formed as to frictionally engage the rim wall 112 and thereby temporarily support the cover member 100 in place pending the application of either the wheel covering member 99 and the tread band 2. In the event a tire covering member is formed to cover the tread as well as the side of the tire, then the pads or lugs 113 will support such cover from the wheel rim pending the application of the wheel cover member 99. The pads 113, moreover, engage within the forward part of the portion 112 of the rim 27ᵃ as the tire cover is being applied, thereby serving to center the tire cover and to hold the same in centered position. The centering means 113 could be in the form of a ring, but is preferably in the form of individual pads preferably equally spaced circumferentially. Any suitable number of these may be employed, four having been found satisfactory.

The wheel cover member 99 has clinched to it at its outer margin 115 an anti-rattling bead 116 which engages the cover member 100 when the hood 94 is locked by the unit 18. It will be noted that the wheel cover member 99 substantially overlaps the tire cover member 100 at the inner periphery of the latter, so that when the cover member 99 is locked in place, the tire cover members 2 and 100 are also locked against unauthorized removal.

When it is desired to obtain access to the wheel mounting means 25, it is sufficient if the locking unit and associated hood 94 and wheel cover 99 are removed. The cover members 2 and 100 need not be disturbed for this purpose. Likewise, when it is desired to secure the wheel in place on the carrier 23, the cover members 2 and 100 are first applied in position, and then said cover members with the wheel and tire are moved as a unit onto the mounting bolts and the nuts tightened in place. Thereafter, when the hood 94 and wheel cover 99 are locked in place, the tire cover structure is also necessarily locked in place.

Instead of employing a removable snap-on cap such as the cap 13, a hinged cap 117 could be employed. To this end, a hinged bracket 118 is disposed in the space 119 between the hood 94 and wheel cover 99 adjacent the place of connection thereof and secured as by rivet means 120, welding or the like to the hood. The bracket 118 is of U-shaped form and affords spaced perforated ears 121 between and to which the eye 122 of a second hinge bracket 123 is hinged at 124. The bracket 123 extends inwardly through an opening 125 in the adjacent rearwardly depressed portion 126 of the wheel cover 99 and is angular so as to project frontward at 127 from said opening when the cap 117 is in closed position.

The cap 117 may be of any suitable construction and is here illustrated as of laminated form comprising a reinforcing inner part 128 and an ornamental outer sheath 129, and has its margins bent rearwardly and inwardly at 130 to engage the wheel cover 99 at 131 outwardly of the depression 126 and to provide a free retaining edge 132. The inner part 128 has a struck offset portion 133 constituting an attaching bracket to which the channeled front portion 127 of the hinged bracket 123 is fastened at 134. Opposite the hinge structure, a latch spring 135 is fastened, preferably by one of the rivets 104. This spring is formed to snap over the edge 132 of the cap 117 to releasably hold the cap in closed position against rattling. There is sufficient space at the outer periphery of the cap 117 to apply a fingernail or a tool to enable a person to pry the cap off the spring 135 to open position which is shown in dotted lines in Figure 8.

It will be seen that when the cap 117 is open it may move to a substantially horizontal position, the shallow funnel form of the guard 105 rendering the lock unit 18 readily accessible by hand and key. If desired, the cap may be releasably latched or otherwise suitably held in horizontal or other open position.

It is evident from the foregoing that the invention is extremely simple since it involves a minimum of parts which are of a character easily stamped or otherwise formed at low cost, the construction being adapted for use with conventional or other suitable locking mechanisms. The hood may be employed in the absence of a wheel or tire cover means, in which event it will function to lock the wheel to the carrier, and in such event the retaining clips for the caps 13 and 117 may be secured directly to the hood.

It is to be understood that while different locking mechanisms are disclosed in conjunction with different wheel and tire cover constructions, each wheel and cover construction may be used selectively with any one of the locking mechanisms.

In view of the above description taken with the drawings, it is to be noted that applicant has provided a new and improved combination lock and wheel cover structure of such character as will lock the wheel on a support and is capable of also locking the tire in place even in the absence of tire covering means. Thus, employing only a wheel cover such as that illustrated at 87 in Figure 6, and with the tire and wheel fitted in a well such as that shown at 101 in Figure 8, it is evident that the locking of the wheel in place will prevent unauthorized removal of the tire. Likewise, even if the wheel cover member 87 were omitted, the tire would still be prevented from unauthorized removal.

The detents or latches 30 are actuated by pins 181 carried by a lock cylinder 182 controlled by the key 30a or other suitable control means. The pins, upon rotation of the cylinder in the proper direction, retract the latches 30 against the pressure of the spring 30b.

The shell 183 of the lock unit 18 is preferably non-rotatably fitted in the bars 22 and 73, or other parts in which the lock unit fits, so that the cylinder may be readily rotated relative to the shell by the key or other handle.

Suitable provision may be made in the form of the invention shown in Figure 8, such as registerable openings in the tire cover member 100 and the wheel cover member 99, for affording ready access to the tire valve without necessitating removal of either member. If desired, the opening may be only in the tire cover member either to render the valve accessible or so as to require removal of the wheel cover member to gain access to the tire valve.

I am aware that many changes may be made and numerous details of construction may be varied through a wide range without departing from the principles of this invention and I, therefore, do not purpose limiting the patent granted hereon otherwise than necessitated by the prior art.

I claim as follows:

1. A lock structure for a wheel mounted on a support, said structure comprising theftproof locking means formed to interlock with the support and shaped to fit over and prevent unauthorized access to the wheel mounting means, an annular part shaped to extend outwardly for covering an outer part of the wheel, means connecting said part to said locking means, and a guard locked to said locking means and fitting over said connecting means so as to prevent access to said connecting means.

2. A lock structure for a wheel mounted on a support, said structure comprising theftproof locking means formed to interlock with the support and shaped to fit over and prevent unauthorized access to the wheel mounting means, an annular part shaped to extend outwardly for shielding an outer part of the wheel, means connecting said part to said locking means, a guard locked to said locking means and fitting over said connecting means so as to prevent access to said connecting means, and anti-rattle means between said guard and locking means.

3. A lock structure for a wheel assembly, said structure comprising a shield for the outer side of the tire on the wheel, means for supporting said shield from the assembly, a shield for the front of the wheel having a part telescoping the wheel hub for centering said shield on the wheel, and means for locking the second shield in wheel covering position, said means clamping the second shield against the outer side of the first shield to thereby lock said first shield in shielding position.

4. A combination wheel lock and cover structure, comprising a vehicle body having a substantially circular well shaped to receive a spare wheel and tire, said well having a substantially annular wall, a tire cover comprising a circular portion shaped to cover the outer side wall of the tire on the wheel and an expansible and contractible tread covering band portion, said band portion being axially telescoped in said wall when the tire is in the well, the first portion being removable only upon removal of said band portion, said wall preventing sufficient expansion of said band portion to enable said band portion to be removed from proper covering position on the tire in the well, and releasable theftproof locking means for locking said circular side wall portion to said vehicle body.

5. In a wheel assembly a wheel having a depressed hub, hub cap retaining springs and wheel fastening bolts cooperating with said hub, a wheel cover for disposition over an outer side of the wheel and a bell-shaped hood attached to and on the rear of said cover, and a flange formed to fit in said depressed hub and to be engaged by said springs so as to prevent access to said wheel fastening bolts and to center the cover on the wheel.

BLADEN M. SHORT.